United States Patent [19]

Moriya et al.

[11] 3,749,852

[45] July 31, 1973

[54] MAGNETIC RECORDING-REPRODUCING DEVICE

[75] Inventors: Shozo Moriya, Kawasaki; Shoji Ohta, Funabashi; Yasutaka Iwawaki, Tokyo; Yukio Usui, Zushi, all of Japan

[73] Assignee: Canon Kabushiki Kaisha, Tokyo, Japan

[22] Filed: Nov. 6, 1970

[21] Appl. No.: 87,499

[30] Foreign Application Priority Data

Nov. 13, 1969 Japan ................................ 44/91023

[52] U.S. Cl. . 179/100.2 MD, 179/100.2 E, 35/35 C

[51] Int. Cl. ............................................ G11b 5/00

[58] Field of Search .................................... 35/35 C; 179/100.2 MD, 100.2 E

[56] References Cited

UNITED STATES PATENTS

| | | | |
|---|---|---|---|
| 3,343,280 | 9/1967 | Tolnai | 35/35 C |
| 3,560,666 | 2/1971 | Bookman | 179/100.2 E |
| 3,484,955 | 12/1969 | Lippert | 35/35 C |

FOREIGN PATENTS OR APPLICATIONS

| | | | |
|---|---|---|---|
| 730,664 | 5/1955 | Great Britain | 35/35 C |

*Primary Examiner*—James W. Moffitt
*Attorney*—Ward, McElhannon, Brooks & Fitzpatrick

[57] ABSTRACT

A magnetic recording-reproducing device, especially applicable for educational purposes or for dictation. The device used a pre-recorded magnetic tape and an endless magnetic recording medium like an endless magnetic tape removably disposed in a cartridge, and in which information stored in the pre-recorded tape is copied on the endless magnetic recording medium. The endless magnetic recording medium having copied the information from the pre-recorded tape may be reproduced as frequently as desired, and the cartridge containing such endless magnetic recording medium may be interchangeable with another cartridge containing therein an endless magnetic recording medium of a different length in accordance with the varying length of the information to be copied. Thus, desired information may be copied on the endless recording medium and thereafter the copy of such information may be reproduced repeatedly.

2 Claims, 17 Drawing Figures

PATENTED JUL 31 1973

3,749,852

SHEET 02 OF 10

PATENTED JUL 31 1973 3,749,852

SHEET 06 OF 10

INVENTOR.

BY

INVENTOR.

BY

INVENTOR.

BY

INVENTOR.

BY

INVENTOR.

BY

MAGNETIC RECORDING-REPRODUCING DEVICE

BACKGROUND OF THE INVENTION

1. Field of The Invention

This invention relates to a magnetic recording-reproducing device, and more particularly to a magnetic recording-reproducing device which is capable of repeated reproduction and is suitable for educational purposes or for dictation.

2. Description of The Prior Art

It is known to use magnetic recording-reproducing devices for educational purposes, especially foreign language conversation practice, or for dictation. The use of magnetic recording-reproducing devices as means for education or dictation is attributed mostly to the fact that such devices can record and reproduce speech signals very easily and frequently. This will be better understood by taking as an example the case of foreign language learning.

In foreign language learning, especially as viewed in the aspect of speaking ability training, it is well known to repeat aural-oral practice after a model recording in order to achieve a greater learning effect. In learning to speak a foreign language, it is essential to orally imitate each given sentence pattern as a whole including its intonation and pronunciation of individual words and repeat such oral imitation again and again, instead of learning such sentence pattern simply by saying it word by word.

The modern linguisitic holds that the best way to master a foreign language is to begin repeated aural-oral practice with shorter sentences and gradually deal with longer sentences, and this may readily be realized empirically. However, any of the known magnetic recording-reproducing devices designed for language learning has involved quite cumbersome manipulations to carry out such repetitive oral practice and this has often hampered the learner's will to learn. One such device is disclosed in U.S. Pat. No. 2,876,561, wherein each unit of teaching material stored on the teaching track of a pre-recorded tape is reproduced for the learner to listen thereto and thereafter the learner orally imitates such reproduced teaching material while recording his oral imitation on the exercise track of the same tape, whereafter the tape is rewound and the exercise track of the tape is changed over into a reproducing mode. Thus, by playing back the tape again, the learner can listen to his own oral exercise and compare it with the pre-recorded model reading to recognize his own defects or errors if any. The described cycle of process may be repeated until the learner completely masters each unit of teaching material.

As will be readily seen, such a known system involves cumbersome operations such as rewinding the pre-recorded tape by a predetermined amount and stopping it to change over the mode of operation from recording to reproducing mode. These cumbersome operations have served to seriously hamper the learner's will to learn and accordingly his learning effect against the intended purpose of learning by repetition.

An attempt to overcome such drawbacks has been proposed by Japanese Patent Publication No. 16828/1964, which shows a system whereby pre-recorded tape storing teaching material is automatically rewound and converted into a reproducing mode to allow the play back of that tape at a point of time when the reproduction of the teaching material stored in the tape of the recording of the learner's oral exercise has been completed. This system, however, entails very complicated construction of the drive mechanism. Moreover, the teaching tape employed with this system is of the dual-track type which must also serve as an exercise tape, and this has often led to an undesirable result that the pre-recorded teaching material may be erased inadvertently during the use of the tape. Another disadvantage of this system is that the pre-recorded teaching tape is short-lived because it is repeatedly rewound at a high speed to be ready for repeated oral practice. A further disadvantage is that the predetermined amount of tape to be rewound is not compatible with the desire of advanced learners to learn longer units of teaching material. Thus, the above-described system is merely nominal as a means of learning by repetition and could never provide essentially effective educational equipment.

It will be noted in the foregoing that the described method of learning a foreign language by repetition consists of repeating the following four essential processes: (I) aural comprehension of the teaching material during the play back, (II) oral practice of that teaching material, (III) comparison of the oral practice with the teaching material, and (IV) recognition of defects or errors in the oral practice through the foregoing comparison. In order to enable these processes (I) to (IV) to be repeated at a shorter cycle and by a simple operation, there has been proposed a system using an endless exercise tape of a predetermined length in addition to a pre-recorded master tape, whereby during the play back of the master tape the learner can listen to signals reproduced thereby and simultaneously copy these signals on the exercise tape and, when desired, the play back of the master tape may be stopped so that only the exercise tape can be repeatedly played back. (See U.S. Pat. No. 3,059,348, for example.)

According to this system, each unit of the teaching material is reproduced while being copied on the auxiliary endless tape for exercise, and if the learner wants to listen to a desired unit of the teaching material, the master tape may be stopped and maintained so without being rewound while the auxiliary tape may be repeatedly played back to reproduce the copy of the desired unit of the teaching material recorded thereon. This has been successful in enhancing the learning effect, whereas certain problems have also been encountered in this case. One of the problems lies in the predetermined length of the auxiliary endless tape, because when the length of the master tape in use becomes greater as the learner's proficiency level is advanced, the predetermined length of the auxiliary endless tape may not be sufficient to record thereon the entire amount of both the teaching material to be transferred from the master tape and the learner's own oral exercise to be practiced with that teaching material during or after the play back of the master tape. Therefore, even if the auxiliary endless tape is played back, neither the transferred teaching material nor the learner's recorded oral exercise may be complete in length and this leads to no successful aural-oral repetition practice in foreign language learning because the learner cannot fully compare his own pronunciation with the model speech.

Also, where the magnetic recording-reproducing device of the described type is applied for the purpose of dictation, it is often desired to repeatedly reproduce a certain part of recorded information, whereas it has been very difficult to reproduce only such part of the recorded information. This is because the information reproduced may be variable in length and it is very difficult to foresee the exact amount of the tape to be rewound or, in the case of the other tape used for copying and reproducing the original record, the exact amount of information to be copied.

SUMMARY OF THE INVENTION

It is a primary object of the present invention to solve all the described drawbacks and disadvantages inherent to the prior art.

It is another object of the present invention to provide a magnetic recording-reproducing device using an endless magnetic recording medium like an endless magnetic tape removably disposed in a cartridge, and in which information to be repeated is copied on the endless recording medium which may be played back as frequently as desired, the cartridge being interchangeable with another cartridge containing therein an endless magnetic recording medium of a different length in accordance with the varying length of the information to be copied, whereby desired information may be copied on the endless recording medium and thereafter the copy of information may be reproduced repeatedly.

It is still another object of the present invention to provide a magnetic recording-reproducing device which permits the use of various interchangeable cartridges containing therein endless tapes of different lengths prepared so as to allow the repetition intervals to be freely variable, and which may be adapted for educational purposes by using a teaching tape storing units of teaching material corresponding in length to the learner's proficiency level and a cartridge containing an endless exercise tape having a length corresponding to the length of each unit of teaching material, whereby the teaching material is reproduced repeatedly as required for the learner's proficiency level, thereby enhancing the learning effect.

It is still another object of the present invention to provide a magnetic recording-reproducing device for educational purposes using a teaching tape storing therein units of teaching material substantially equal in length and an endless magnetic recording-reproducing medium contained in a cartridge and having a length about twice as great as the length of each unit of teaching material, whereby such unit of teaching material may be transferred from the teaching tape onto the endless tape while a learner's oral practice may be separately recorded on the same endless tape, thereby enhancing the efficiency of learning by repetition.

It is yet another object of the present invention to provide a magnetic recording-reproducing device for educational purposes of the described type which is compact in construction and simple to operate with various depression keys as well as highly reliable in performance.

It is still another object of the present invention to provide a magnetic recording-reproducing device for educational purposes in which change-over between the mode of operation for reproducing the teaching material stored in a master tape and the mode operation for recording a learner's oral practice on an auxiliary tape is electrically accomplished by a remote control switch without producing any reproduction strain in the auxiliary tape due to the transient characteristic, whereby a complete unit of oral exercise can be always reproduced on the auxiliary endless tape even if it is very short.

It is yet still another object of the present invention to provide a magnetic recording-reproducing device for educational purposes which can use a teaching tape storing therein units of teaching material corresponding in length to any proficiency level of the learner to ensure a perfect effect of learning by repetition.

Other objects and features of the present invention will become fully apparent from the following illustrative description taken in conjunction with the accompanying drawings.

DESCRIPTION OF THE PREFERRED EMBODIMENTS

Figure 1:
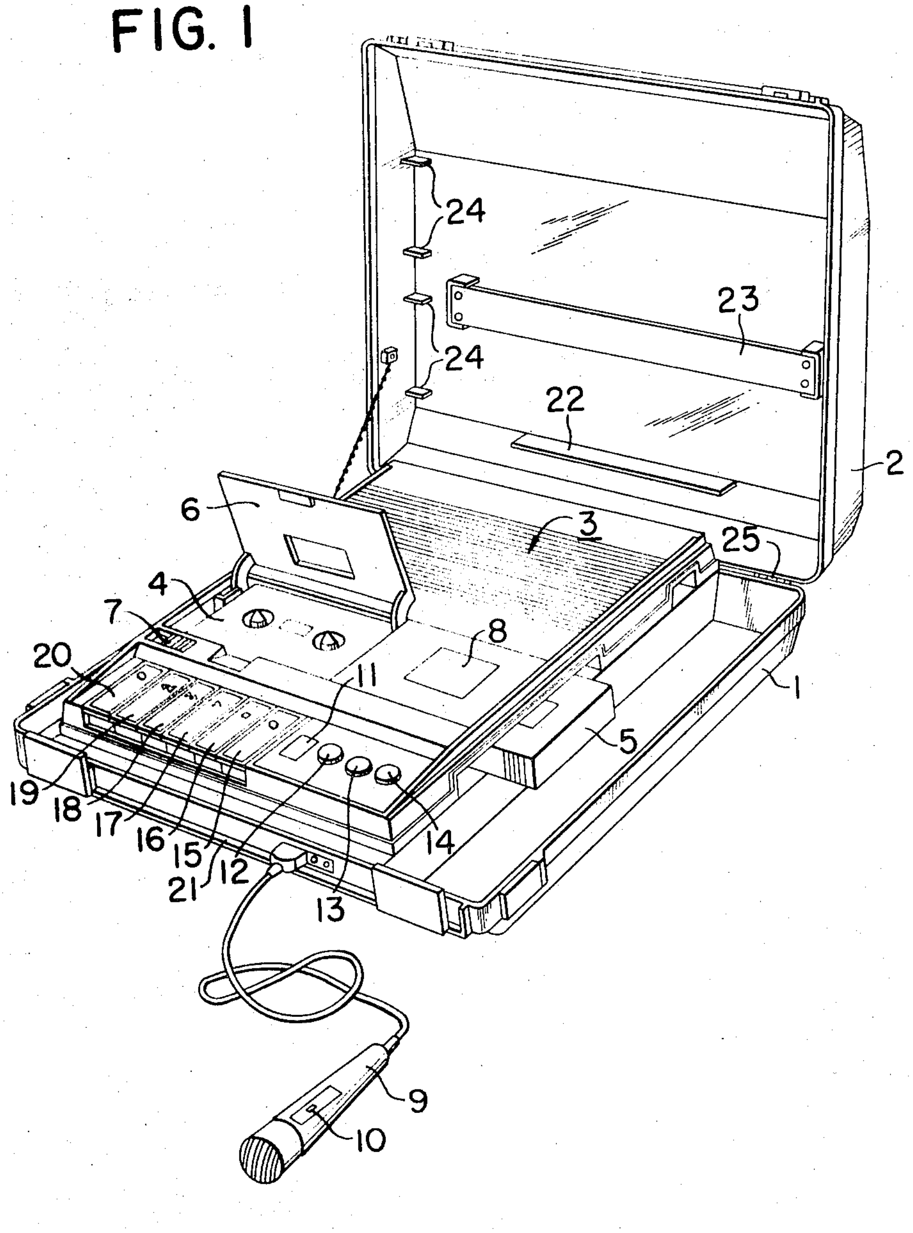
FIG. 1 is a perspective view of a magnetic recording-reproducing device for foreign language learning according to the present invention, with the housing being open to show the interior thereof.

Referring to FIG. 1, a case 1 having a lid 2 hinged thereto contains therein a magnetic tape recording-reproducing device 3 for foreign language learning according to the present invention. A cassette type master tape 4 having teaching materials pre-recorded therein is disposed in the left-hand portion of the device 3, while an auxiliary endless tape cassette 5 for learner's exercise having a tape length about twice as great as the amount of each unit of the teaching material recorded on the master tape 4 is interchangeably disposed in the right-hand portion of the device 3. The master tape cassette 4 has a lid 6 adapted to be raised and opened by an eject lever 7, and the auxiliary tape cassette 5 has a window 8 for observing therethrough indicia provided on the core of the auxiliary tape cassette to thereby check the amount of movement of the auxiliary tape. A microphone 9 provided with a remote control switch 10 is attached to the device through a cord. A level meter 11 for checking the recording level and the battery voltage is provided in the right front portion of the device, and adjacent thereto there are knobs 12, 13 and 14 for controlling the recording level, reproducing level and tone quality, respectively. In the left front portion of the device there are various operating keys, namely, repeat key 15, stop key 16, master tape play-back key 17, fast forward key 18, rewind key 19 and master tape record key 20. Each of these keys is locked by unshown lock means when depressed, and unlocked when the stop key is depressed.

A projected member 21 is formed in the lower portion of the front side wall of the case 1 so as to be engaged by the user's finger to facilitate the depression of the respective keys 15 to 20.

A projected member 22 provided in the interior of the lid 2 serves as textbook support means when the device is in use, so that the user may read a textbook corresponding to the prerecorded master tape while listening to it. A textbook holder band 23 is also provided inwardly and transversely of the lid 2 so as to hold the textbook when it is not in use. A plurality of master tape cassette holder means 24 extend inwardly from the left side wall of the lid 2.

The case 1 and lid 2 are hinged together at 25 to form a shape similar to the so-called attache case, and the device 3 is incorporated integrally within the case 1.

In operation, a desired master tape 4 is first selected and put in place in the device 3, and subsequently an auxiliary endless tape cassette 5 having a tape length about twice as long as the amount of each unit of teaching material recorded on the master tape 4 is selected and inserted into the device 3 from the right side thereof, in the manner as shown in FIG. 1. Thereafter, the lid 2 is closed and the play-back key 17 is depressed to reproduce the teaching material stored in the master tape, so that the learner can listen to the master tape. while so listening or after having completed the listening, the remote control switch 10 on the microphone 9 is closed to enable the learner to start his own oral exercises through the microphone 9. Upon completion of such oral exercise, the remote control swtich 10 is again opened. Thereafter, by depressing the repeat key 15 to return the play-back key 17 to its initial or inoperative position, the play back of the master tape 4 is stopped while the auxiliary tape 5 starts to play back both the signals transferred thereto from the master tape and the signals recorded thereon by the learner himself. Thus, a copy of the teaching material and its imitation by the learner both recorded on the auxiliary endless tape may be reproduced simultaneously or one after the other, so that the learner can listen to the two types of record of the same teaching material and compare one with the other. When the learner finds out some defects or errors in his own recorded exercise during the play back of the auxiliary endless tape 5, the remote control switch 10 is again closed to enable the learner to practice his oral exercise again through the microphone while listening to the copy of the teaching material previously recorded on that auxiliary tape, whereby signals representing his such new oral practice are recorded on the auxiliary endless tape. Thus, by opening the remote control switch 10 again, the signals representing the previous oral practice stored on the auxiliary endless tape are erased while the signals representing the new oral practice are reproduced together with or in succession to the teaching material copied on the auxiliary tape from the master tape. Such operation may be repreated as frequently as desired until the learner completely or nearly completely acquires an oral imitation of the teaching material. When the learner has accomplished such oral imitation to a satisfactory degree, he may again depress the play-back key 17 to play back the master tape 4 to reproduce a further unit of the teaching material, which is thereby automatically transferred onto the auxiliary tape 5 in the same way as before, so that the learner can practice his oral exercise with that unit of the teaching material and thus continue his work of study.

With the device of the present invention as applied for learning a foreign language, the laarner can thoroughly pursue his study through oral repetition simply by closing and opening the remote control switch This will enhance the learner's will to learn and enable him to achieve the mastery of the teaching material.

Figure 2:
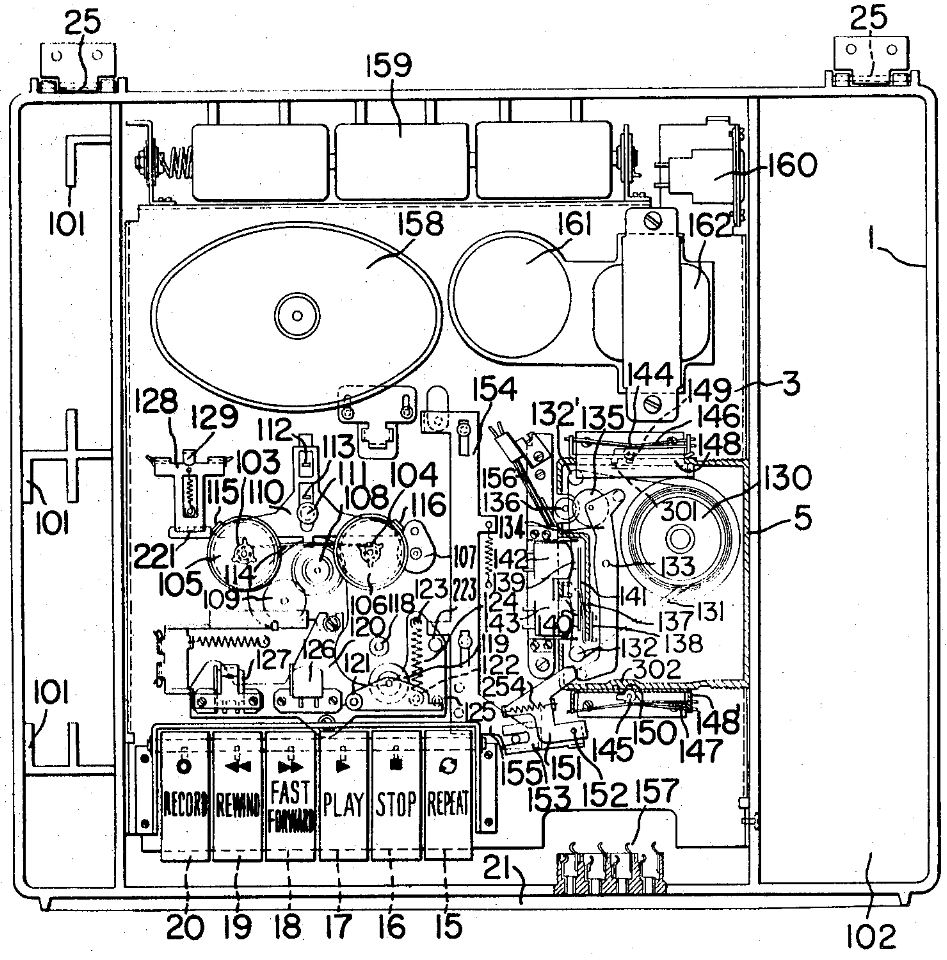
FIG. 2 is a top plan view of the device of FIG. 1.

The construction of the device of FIG. 1 will now be described in greater detail. Referring to FIG. 2, there is shown the magnetic recording-reproducing device 3 housed in the case 1 with the lid 2 and master tape cassette 4 removed but with the auxiliary tape cassette 5 inserted in position. A plurality of partition walls 101, defining compartments for accommodating tape cassettes for use with the device, are provided in the left-hand portion of the cae 1, and a space 102 for accommodating the microphone and other accessories is provided in the right-hand portion of the case 1. A pair of reel shafts 103 and 104 are provided to engage the reel shafts in the master tape cassette to drive the master tape reels for rotation. A rewind drive rim 105 and a take-up drive rim 106, each of which has its circumference formed of rubber, are secured to the shafts 103 and 104, respectively. A take-up roller 107 adapted to be urged into contact with the take-up drive rim 106 upon depression of the play-back key 17 is provided rightwardly of the take-up drive rim 106, and a fast forward roller 108 adapted to be urged into contact with the take-up rim 106 to fast drive this rim is provided leftwardly of the take-up rim 106. Between the rewind drive rim 105 and the fast forward roller 108 there is a rewind roller 109 adapted to be urged into contact with the rim 105 and the roller 108 upon depression of the rewind key 19 to thereby transmit the drive of the fast forward roller 108 to the rim 105. A brake arm 110 vertically guided along a stationary pin 111 studded in a base plate is provided in opposed relationship with the rims 105 and 106. The brake arm 110 is movable discretely by a first release lever 112 displaceable upon depression of the play-back key 17 and by a second release lever 113 displaceable upon depression of the rewind key 19 and fast forward key 18, and is normally urged downwardly by a fixed pressure spring 114 so that upright projections 115 and 116 formed at the ends of the brake arm 110 brake the circumferential rubber members of the rims 105 and 106 and accordingly brake the reel shafts 103 and 104.

There are also seen a capstan 118 and a pinch roller 119. A movable plate 120, which is slidable upwardly frfom the shown position upon depression of the play-back key 17, has a studded pin 121 having a pinch roller arm 122 pivotally mounted thereon. The pinch roller 119 is rotatably held by the pinch roller arm 122 and normally urged counter-clockwise by a compression spring 124 extending between the pinch roller arm 122 and the studded pin 123. A stopper 125 is also studded on the movable plate 120 for stopping the pinch roller arm 122.

A record-reproduce head 126 and an erase head 127 are mounted in side-by-side relationship with the pinch roller 119 on the movable plate 120.

In the proximity of the rewind shaft 103 there is an erroneous record preventing member 128 having detector means 129, which detects a recess formed in one side of the master tape cassette and representing the fact that the master tape is a prerecorded one, to thereby disable the depression of the record key 20 as will be described.

The auxiliary tape cassette 5 inserted in the right portion of the device 3 contains therein a core 130 having an endless tape 131 wound thereon. The endless tape 131 is passed around guide pins 132 and 132' studded in the cassette 5 at the two inner courners thereof. A pivot pin 133 studded in the cassette 5 pivotally supports a pinch roller arm 134 carrying thereon an auxiliary tape pinch roller 135. The endless tape 131 is nipped between the auxiliary tape pinch roller 135 and an auxiliary tape capstan 136 opposed thereto.

The cassette 5 has a recessed integral inner wall 137 formed to allow the passage of the tape 131 in front of the cassette. In the recess defined by the recessed inner wall 137 of the cassette 5, there is provided a head pad support arm 141 formed by bending a plate spring and secured to pins studded in the cassette. The head pad support arm 141 carries felt pads 139 and 140 attached to the opposite ends thereof, and it is engaged at its central portion by a support arm 138 (see FIG. 8). An auxiliary tape record-reproduce head 142 and an auxiliary tape erase head 143 are positioned to correspond to the head pads 139 and 140, respectively.

Auxiliary tape cassette positioning rollers 144 and 145 shown at the opposite sides of the cassette 5 are normally urged gy plate springs 146 and 147 into engagement with apertures formed in fixed plates 148 and 148'. When the cassette 5 is inserted into the device 3, these cassette positioning rollers 144 and 145 are received into recesses 149 and 150 formed in the opposite side walls of the cassette 5, thereby holding the cassette 5 at the opposite sides thereof. A lever 151 for urging the auxiliary tape pinch roller 135 is pivotally mounted on a pin 152 studded in the base plate, and an actuator lever 153 having a fork portion is also pivotally mounted on the same pin 152. A drive spring 254 connects the levers 151 and 153 to each other. The urge lever 151 has an arm portion extending through an opening in the cassette 5 to engage one end of the pinch roller arm 134.

A movable plate 154 adapted to slide upwardly upon depression of the play-back key 17 and repeat key 15 has an arm portion 155 at one end thereof having a fixed pin, which pin is engaged by the fork portion of the actuator lever 153.

An actuator switch 156 is also provided which is adapted to be closed by a side wall of the cassette 5 upon insertion thereof into the device 3 to thereby actuate a bias oscillator to be described. In the rightward and forward portion of the device 3, there are a plurality of sockets 157 for receiving the jacks of microphone, remote control switch, head phone, etc. In the rearward portion of the device there are disposed a loudspeaker 158, a battery 159, an AC power supply terminal 160, a motor 161 and a transformer 162.

Figure 3:
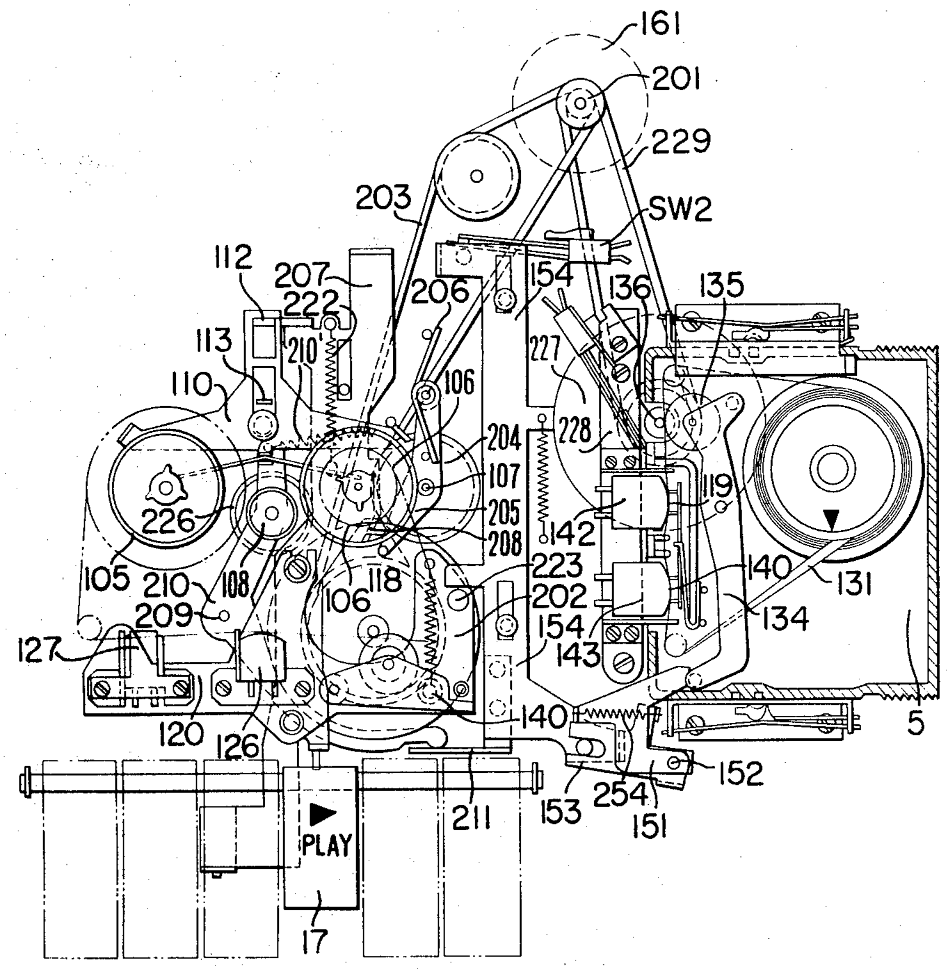
FIGS. 3 to 7 show details of the drive mechanism in the device of FIG. 2.
Figures 4, 4A:
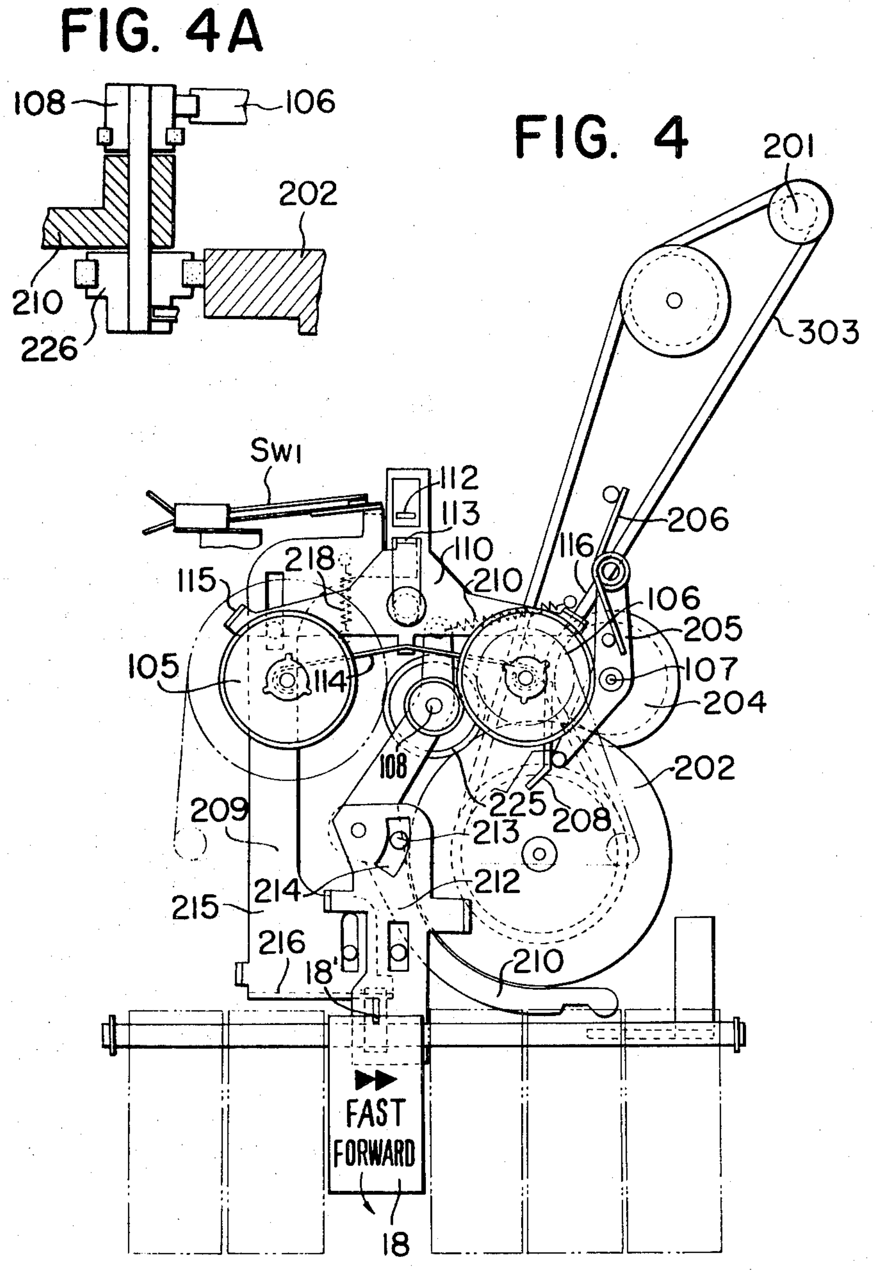

Turning to FIGS. 3 to 7, there is shown the master tape drive mechanism in the device shown in FIG. 2 and described above. As shown in FIG. 3, the master tape capstan 118 is driven from the motor 161 via rubber belt 203 entrained on a pulley 201 and a fly-wheel 202 which is mounted coaxially with the capstan 118. The rubber belt 203 is at the same time engaged with a take-up pulley 204 to transmit the drive of the motor 161 thereto. The take-up pulley 204 is so arranged that the take-up roller 107 secured to the upper portion of the shaft thereof can be urged into contact with the take-up rim 106, while the pulley 204 is loosely mounted on an actuator lever 205, which has one end thereof pivoted and is urged clockwise by a spirng 206 so that the take-up roller 107 is normally disengaged from the rim 106 by the bent portion 208 of the slide lever 207 formed integrally with the slidable plate 120, as shown in FIG. 4. The fast forward roller 108 is loosely mounted on a driven lever 210 pivotally mounted by means of pin 209 on an actuator plate 212 (FIG. 4) which is slidable upon depression of the fast forward key 18, and a guide pin 213 studded in the base plate is received in an arcuate slot 214 formed in the actuator plate 212 (FIG. 4).

In the normal or inoperative position of the driven lever 210, the actuator plate 212 is pulled back by the lever end 18' of the fast forward key 18 so that the fast forward roller 108 is disengaged from the take-up rim 106 while a rubber roller 226 secured coaxially with the fast forward roller 108 is engaged with the flywheel 202 to receive the drive of the fly-wheel (see FIG. 4A).

As shown in FIG. 4, a brake actuator plate 215 slidable upwardly upon depression of the fast forward key 18 causes the brake arm 110 to be upwardly moved by its second brake release lever 113 to thereby disengage the upright projections 115 and 116 from the rims 105 and 106 and release the brake, and at the same time close a motor drive switch SW1.

Figures 5, 5A:
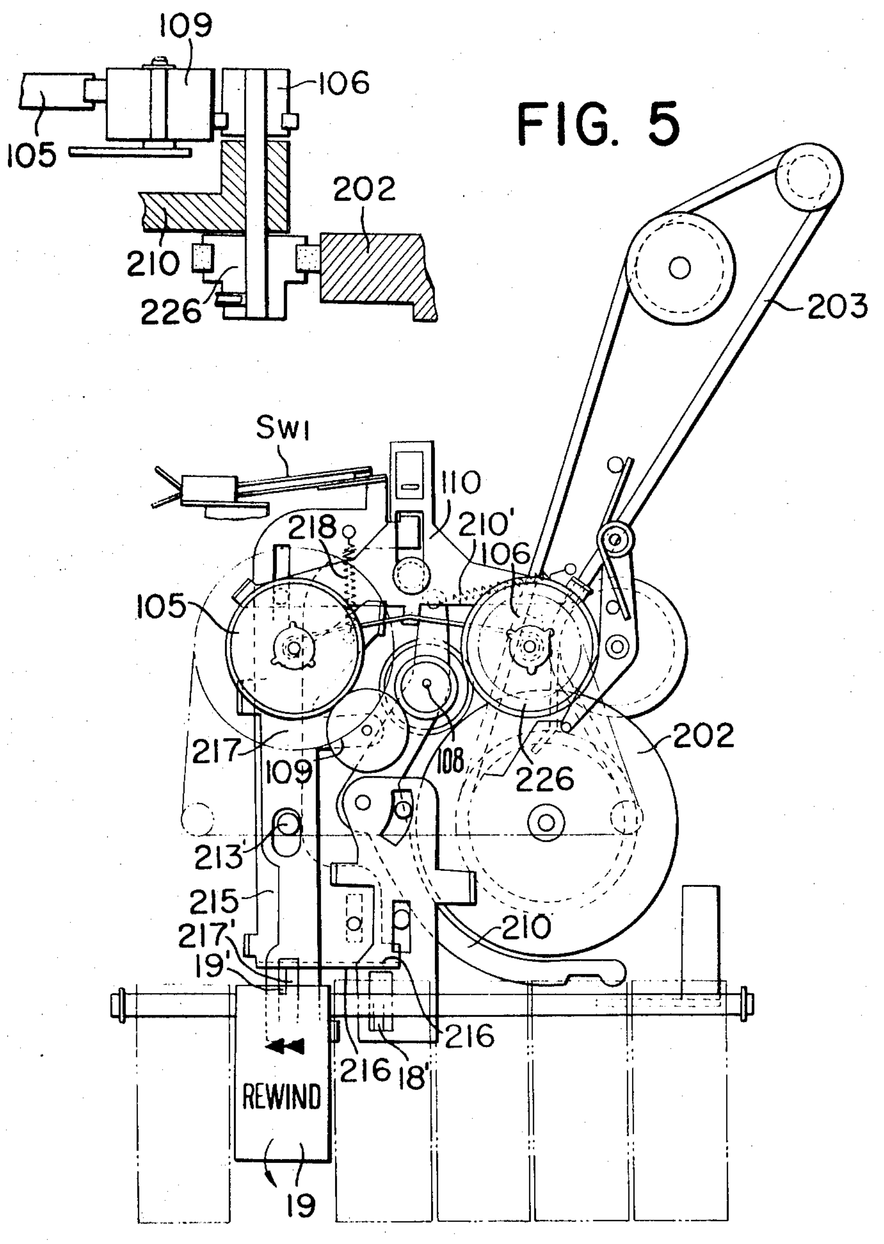

The brake actuator plate 215 has a bent portion 216 which, as shown in FIG. 5, extends to the pawl 19' of the rewind key 19 so as to enable the brake actuator plate 215 to be actuated to slide by the rewind key 19 as well.

FIG. 5 shows the manner in which the master tape is rewound. Upon depression of the rewind key 19, the bent portion 216 of the brake actuator plate 215 is urged to move upwardly by the pawl 19' of the key 19 to thereby release the brake arm 110 and close the switch SW1, so that the motor 161 is started to drive the fly-wheel 202.

When the rewind key 19 is being depressed, the fast forward roller 108 is disengaged from the take-up rim 106 but the roller 118 is permitted to rotate because the rubber roller 226 mounted coaxially with the rim 106 therebelow is engaged with the fly-wheel 202 (see FIG. 5A).

Upward movement of the brake actuator plate 215 causes a spring 218 extending between the brake actuator plate 215 and the slide plate 217 to be charged.

The slide plate 217 has a slot 217' formed in the lower portion thereof to receive the pawl 19' of the rewind key 19 which is raised when the key 19 is depressed. With the raise of the pawl 19', the slide plate 217 is also allowed to move upwardly by the force of the spring 218.

With the upward movement of the slide plate 217, the rewind roller 109 on the arm of the slide plate 217 is urged into engagement with both of the rewind rim 105 and the fast forward roller 108 to thereby transmit the drive of the roller 108 to the rewind rim 105.

Figure 6:
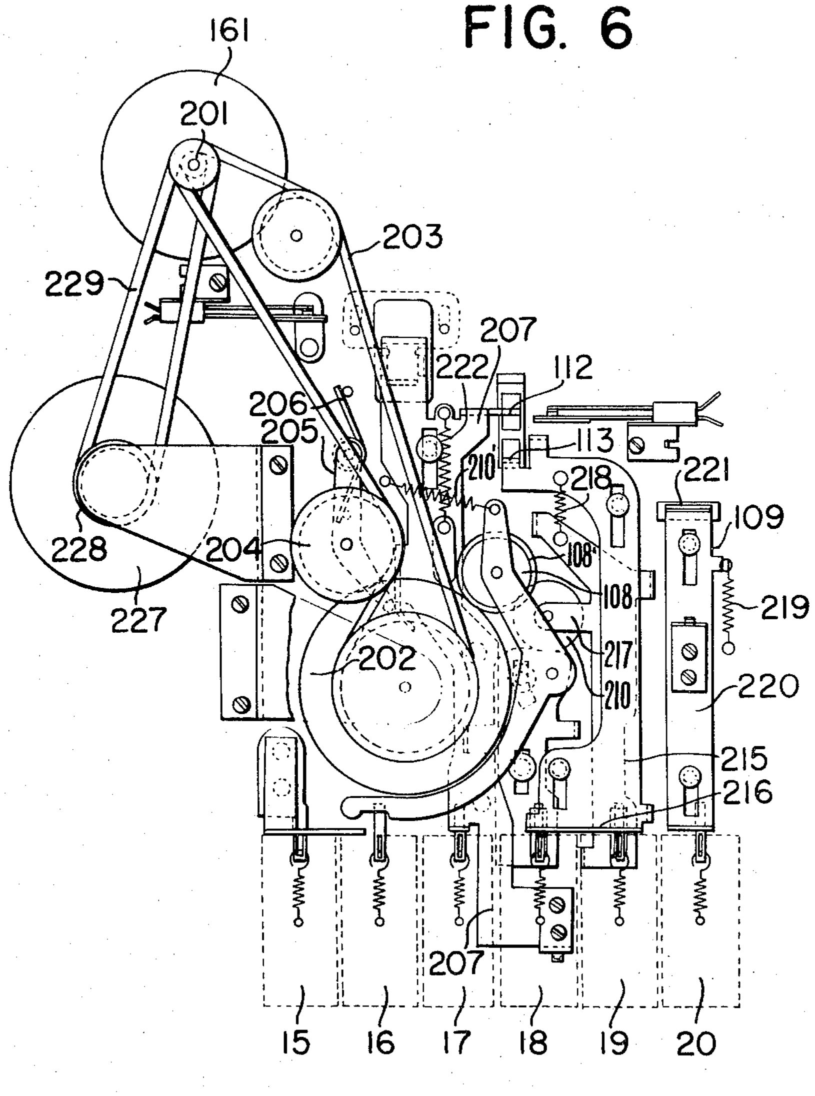

FIG. 6 is a rear view of the described drive mechanism. A change-over lever 220 upwardly slidable against the force of a spring 219 upon depression of the record key 20 is provided to actuate a record-reproduce change-over switch (not shown). When a pre-recorded master tape cassette is in use, the detector means 129 of the erroneous record preventing member 128 detects a predetermined recess formed in a side wall of such cassette so that the projected portion 221 of the change-over lever 220 is so displaced as to block the movement of the change-over lever, thus preventing depression of the record key 20 and accordingly prevent any erroneous record from being effected.

In operating the above-described master tape drive mechanism, the play-back key 17 is first depressed to play back the teaching material pre-recorded in the master tape, whereupon the slide lever 207 is urged upwardly against the force of return spring 222 (FIG. 3) exerted on that slide lever. This causes the brake release lever 112 to raise the brake arm 110 against the force of spring 114, whereby the brake actuator portions 115 and 116 are disengaged from the rewind and take-up rims 105 and 106 and the brake is thus released. At the same time, the movable plate 120 is moved into its operative position so that the master tape is nipped between the capstan 118 and the pinch roller 119 and also urged into contact with the magnetic heads 126 and 127. With the displacement of the movable plate 120, the movable plate 154 is slidingly moved upwardly by a pin 223 studded in the movable plate 120, thereby changing over a switch SW2 into ON position. The switch SW2 is a double switch for changing over the motor 161 and an amplifier to be described into their respective operative positions.

Thus, the motor 161 starts rotation to drive the master tape, while the lever 205 pivoted to the pulley 204 urges the projected portion 208 of the slide lever 207 so as to allow the take-up roller 107 to be urged into contact with the take-up rim 106 by the spring 206, whereby the take-up rim 106 is driven to take-up the master tape on a reel in the cartridge.

If the stop key 16 is then depressed to unlock the play-back key 17, the various members described just above will return to their initial positions as shown in the rear view of FIG. 6, so that each drive means is stopped.

Subsequently, when the fast forward key 18 is depressed, the brake actuator plate 215 is moved upwardly against the force of spring 224 as shown in FIG. 4, whereby the release lever 113 causes the brake arm 110 to slidingly displace against the force of spring 114, thereby disengaging the brake actuator portions 115 and 116 from the rims 105 and 106 respectively.

Upon displacement of the brake actuator plate, the driven lever 210 holding the fast forward roller 108 is rotated clockwise about pin 209 by the force of spring 210' until it is guided into the slot 214 in the actuator plate 212 slidable with the upward movement of the brake actuator plate 215, and thus the driven roller 226 pivotally mounted on the driven lever 210 is moved rightwardly and upwardly along the perpheral edge of the fly-wheel 202 to thereby urge the fast forward roller 108 into engagement with the periphery of the take-up rim 106. Also, the driven roller 226 coaxial with the fast forward roller 108 is urged into contact with the periphery of the fly-wheel 202 (see FIG. 4A). The motor 161 is started through the switch SW1 actuated by the shoulder of the actuator plate 215, and the drive of the motor 161 is trasmitted through the fly-wheel 202 and roller 108 to the take-up rim 106, which is thus rotated fast. When the rewind key 19 is depressed after depression of the stop key 16, the brake actuator plate 215 is displaced in the manner as described, to thereby release the brake, but the actuator lever 212 is not displaced and accordingly the fast forward roller 108 is not engaged with the take-up rim 106. Thus, the rotational force of the fly-wheel 202 is transmitted to the rewind rim 105 through the rubber roller 226 and the overlying coaxial fast forward roller 108 and further through the rewind roller 109 on the slide plate 217 slidably upon depression of the rewind key 19, whereby the master tape is rewound by the rewind rim 105.

Thus, by the depression of the rewind key 19 as shown in FIG. 5, the pawl 19' thereof is caused to raise the brake actuator plate 215 to thereby release the brake arm 110 while raising the slide plate 215 with the aid of spring 218, whereby the rewind roller 109 is urged into contact between the fast forward roller 108 and the rewind rim 105 as shown in FIG. 5A.

As a result, the switch SW1 is closed by the brake release plate 217 to cause rotation of the fly-wheel 202 while the drive of the motor 161 is transmitted through the fast forward roller 108 and rewind roller 109 to the rewind rim 105, which thus rewinds the master tape.

Figure 7:
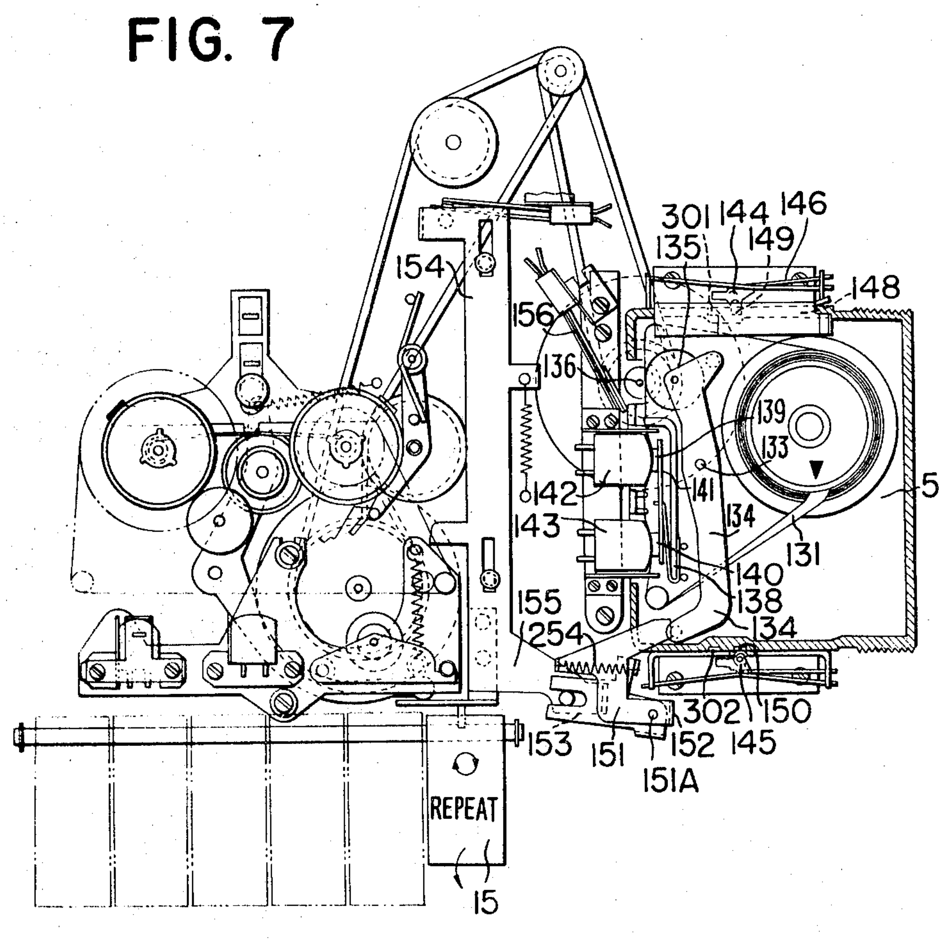
Figure 9:
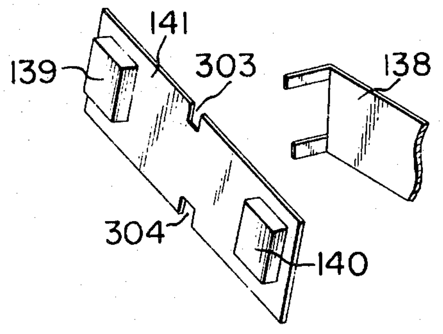
FIGS. 8 and 9 show a pad support member for an auxiliary tape cassette used with the device of FIG. 2.

Description will now be made to the arrangement of the auxiliary endless tape drive mechanism with reference to FIGS. 2, 3 and 7. When the auxiliary tape cassette 5 is inserted into the device 3, the auxiliary tape 131 in the front recess of the cassette 5 is urged into contact with the heads 142 and 143 by the pads 139 and 140, respectively. Below the capstan 136 there is a fly-wheel 227 mounted coaxially with the capstan, and the drive of the motor 161 is transmitted to the fly-wheel 227 through a drive belt 229 entrained on a motor pulley 201 and fly-wheel 227.

Upon insertion of the cassette 5, the cassette positioning rollers 144 and 145 are received into the recesses 149 and 150 formed in the opposite side walls of the cassette so that the cassette 5 is securely held in proper position.

With the cassette 5 thus placed in position, the pinch roller urge lever 151 extends into the interior of the cassette until its inner end is positioned just in front of a pin studded in the corresponding end of the pinch roller cam 134. Thus, the pinch roller arm 154 remains in loose position (FIG. 3).

A spring 254 interposed bewteen the pinch roller urge lever 151 and actuator lever 153 is charged by depressing the play-back key 17 (FIG. 3) or the repeat key 15 (FIG. 7) to cause the movable plate 154 to slide to actuate the actuate the actuator lever 153. Since the levers 151 and 153 are pivoted at a common pivot 151A, the charged spring 254 urges the pinch roller urge arm 134 into contact with the capstan 136 via the pinch roller urge lever 151.

Since the movable plate 154 is slidingly moved to close the drive switch SW2 of the motor 161 upon depression of the playback key 17 and repeat key 15 as described above, the auxiliary endless tape 131 in the cassette 5 is driven at all times during the master tape recording-reproducing operation or during the auxiliary tape recording-reproducing operation.

The auxiliary tape capstan 136 is driven to rotate at all times while the motor 161 is being rotated. Therefore, when any other key than the stop key 16 is depressed, the capstan 136 is always rotated so that the auxiliary tape 131 is also driven to move upon engagement with the capstan. Thus, the rising characteristic of the movement of the auxiliary tape is very excellent.

Figure 8:
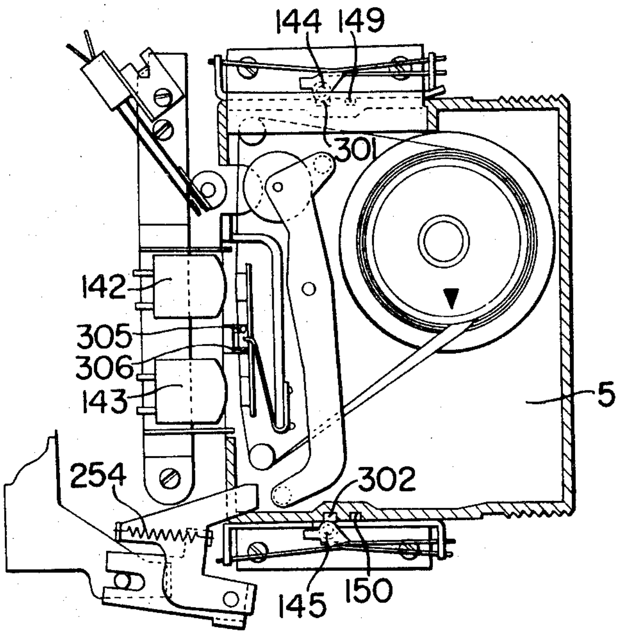

As shown in FIG. 8, the auxiliary tape cassette used with the present invention has recesses 149, 150 formed in the opposite side walls thereof for holding the cassette in its operative position, as well as recesses 301, 302 also formed in the opposite side walls for holding the cassette in its inoperative position, the latter recesses 301 and 302 being adjacent to the former recesses 149 and 150, respectively. When such auxiliary tape is not in use, the cassette positioning rollers 144 and 145 are received into the recesses 301 and 302 to hold the cassette 5 in its inoperative position, as shown in FIG. 7.

When the auxiliary tape cassette 5 is positioned in its inoperative position with the tape 131 therein being urged toward the heads 142 and 143 by the plate spring 138 received in the cutaways 303 and 304 formed centrally of the upper and lower sides of the support arm 141 having the tape pads 139 and 140 attached thereto at the opposite ends, the support arm 141 is closely held against fixed stoppers 305 and 306 formed in the front side of the cassette 5.

Therefore, if the cassette 5 is set in its operative position, the pads 139 and 140 will be pushed back by the heads 142 and 143 so that the support arm 141 is disengaged from the stopper 305. Since the support arm 141 is always urged at its center portion by the plate spring 138, the pressures exerted on the heads 142 and 143 by the pads 139 and 140 are always equal so that the irregularity of recording-reproducing effect which may result from unequal contact pressures between the heads and pads is substantially eliminated. Also, the necessity of adjusting the pad pressures is completely eliminated during the manufacture of the auxiliary tape cassette.

Figure 10:
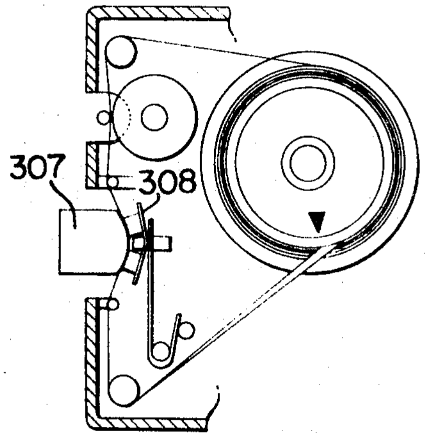
FIGS. 10 and 11 show another form of the pad support member.
Figure 11:
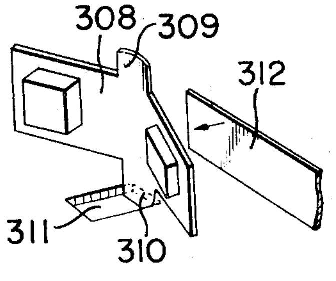
Figure 12:
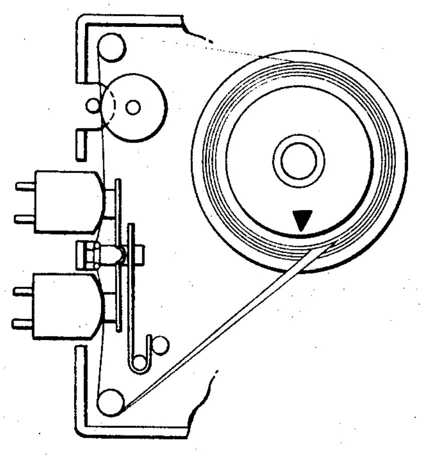
FIGS. 12 and 13 show still another form of the pad support member.
Figure 13:
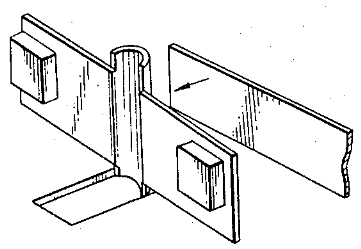

FIGS. 10 and 11 show another example of the tape pad holder means applicable to a unitary type head assembly 307 comprising an erase head and a record-reproduce head for the auxiliary tape cassette 5. A pad holder plate 308 is bent at an obtuse angle in the center portion thereof, which is formed with projections 309 and 310 swingably received in slots 311 formed in the upper and lower plates of the cassette 5. The holder plate 308 is always urged at the center thereof by a plate spring 312 disposed rearwardly thereof. Such pad holder plate may also be applicable to the above-described two separate head arrangement as shown in FIGS. 12 and 13.

Figure 14:
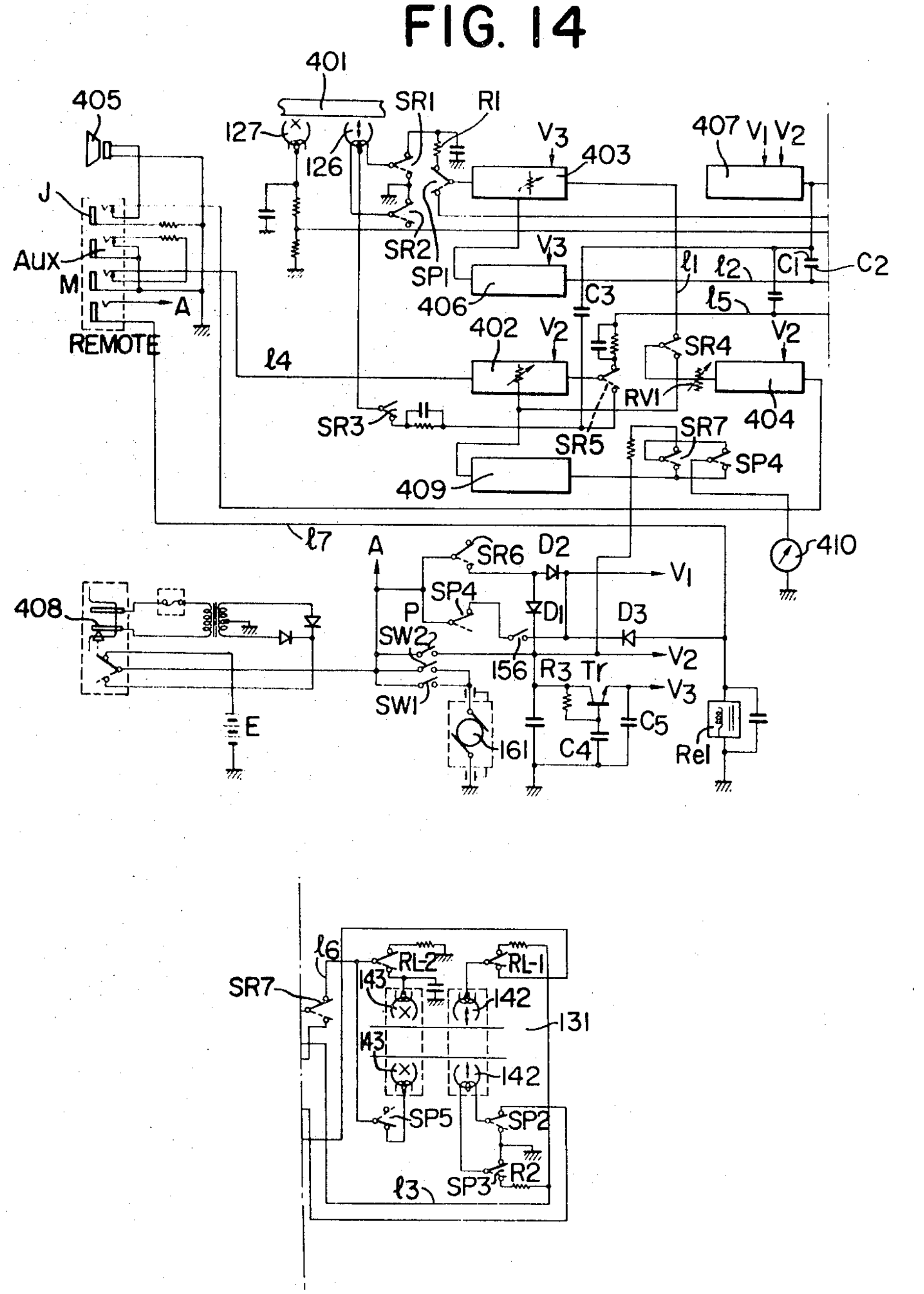
FIG. 14 is a block diagram of the electric circuit in the device of the present invention.

The electric circuit arrangement in the illustrated device of the present invention will now be described with reference to FIG. 14. In FIG. 14, the magnetic tape contained in the master tape cassette is designated at 401. Switches SR1, SR2 and SR3 changeable over from the shown positions to the imaginary positions upon depression of the record key 20 are respectively connected with the entry, center and exit terminals of the record-reproduce head 126. Upon depression of the record key 20, the switches SR1 and SR2 are grounded while the switch SR3 is connected with a record amplifier 402 through a switch SR5 to be described. The amplifier 402 is of the known type which is operable upon application of an operating voltage V2. The change-over switch SR1 is normally connected with the movable contact of a change-over switch SP1 through a resistor R1.

The movable contact of the switch SP1 is connected with a preamplifier 403, which is of the known type oeperable upon application of an operating voltage V3 and connected through a line *l*1 with a change-over switch SR4 changeable over to the imaginary position upon depression of the record key 20, and through a volume control variable resistor RV1 with a main amplifier 404. The main amplifier 404 is of the known type which is operable upon application of an operating voltage V2. The output of the main amplifier 404 is connected with a loudspeaker 405 through a head phone jack J.

A part of the output of the preamplifier 403 is normally applied to an auxiliary record amplifier 406 which is operable to amplify the operating voltage V3 when it is applied.

The output of the auxiliary amplifier 406 is connected through a line *l*2 with a change-over switch SP2 changeable over to the shown position upon depression of the play-back key 17 and further with one end of the winding of a record-reproduce head 142 opposed to the teaching material copying track on the auxiliary tape 131 in the cassette 5. A change-over switch SP3 connected with the other end of the winding of the head 142 is of the similar type to the switch SP2 which is changed over upon depression of the play-back key 17, and the switch SP3 is connected with a normally grounded change-over contact and also connected with the change-over contact of the change-over switch SP1 through a resistor R2 and a line *l*3.

Input of the microphone jack M is connected through line *l*4 with the record amplifier 402, whose output is applied through line *l*5 and further through contact RL–1 operable by a relay RL to be described, to the portion of the dual-track record-reproduce head 142 which corresponds to the exercise track of the auxiliary endless tape 131. The head 142 is connected with the output of the record amplifier 402 through the line *l*5 during the reproducing operation.

A high-frequency bias oscillator 407 produces an oscillation output upon application of operating voltages V1 and V2 applies a bias current, on the one hand, through line *l*6 and relay contact RL–2 to the erase head 143, and on the other hand, through capacitor C1 to the portion of the record-reproduce head 142 corresponding to the teaching material copying track of the auxiliary endless tape 131 so as to provide AC bias record on that tape. Further, the bias oscillator applies a bias current through capacitor C2 to the record-reproduce head 142, and through capacitor C3 to the master tape record-reproduce head 126. The bias oscillator 407 is also connected so as to apply an erasing current to the erase heads 127 and 143 through change-over switch. A jack designated by "Remote" receives therein the terminal of the remote control switch 10, which may be contained in the microphone 9 or provided separately from the microphone, and one terminal of this jack is connected with a point A to which a voltage from battery E or commercially available power source 408 is normally applied under transformation and rectification. The other terminal of the jack "Remote" is connected with a relay Rel through line *l*7. The battery E durther applies an operating voltage V2 through the parallel switch circuit of SW1 – SW2 to the drive motor 161 and through the switch SW2, and also provides an operating voltage V3 through a smoothing circuit comprising a resistor R3, a capacitor C4, a transistor T*r* and a capacitor C5.

Change-over switches SR6 and SP4 connected in parallel with the point A are changed over to the imaginary positions upon depression of the record key 20 and play-back key 17, respectively. The change-over switch SP4 is connected with the relay Rel through switch 156 and diode D3, the switch 156 being closed upon operative insertion of the auxiliary tape cassette 5. The change-over switch SR6 provides an operating voltage V1 through diode D2. This operating voltage V1 is supplied only to the bias oscillator 407 as described above, and the power comsumption of this voltage is about 100 times or more that of the operating voltages V2 and V3 for the amplifiers except main amplifier 404. For this reason, the switch 156 is kept open when the auxiliary cassette 5 is not inserted, thereby preventing the supply of the voltage V1 to economize the power consumption of the battery.

A meter amplifier 409 further amplifies the output of the record amplifier 402 and the recording level is checked by a level meter 410. Switches SR7 and SP4 connected in series with the level meter 410 are changed over to the imaginary positions upon depression of the play-back and record keys respectively, so as to convert the meter 410 to a battery checker.

The circuit operation will now be described by way of example. When the master tape cassette 4 and the auxiliary tape cassette 5 are inserted in place the switch 156 is closed by the cassette 5. By depressing the play-back key 17, the change-over switch SP4 is closed. As a result, the operating voltage V1 is applied to the bias oscillator 407 through E – SP3 – 156 – V1. Thereafter, when the play-back key 17 is depressed to reproduce the master tape storing the teaching material, the switch SW2 is closed by the slide plate 154 as described previously, thereby starting the motor 161. Thus, the master tape and auxiliary tape start to move while the respective amplifier operating voltages V1, V2 and V3 are applied. The teaching material stored in the master tape 401 are reproduced by the head 126 and amplified through SR1 – preamplifier 403 – SR4 – main amplifier 404 – loudspeaker 405, and at the same time the teaching material is copied on the auxiliary tape 131 through head 126 – SR1 – preamplifier 403 – auxiliary amplifier 406 – *l* 2 – SP2 – head 142. Since the change-over switch SP5 is in the shown position by the depression of the play-back key 17, a bias current is applied from the bias oscillator 407 through capacitor C1 to head 142 and an erase current is applied through SR7 and SP5 to the erase head, so that the teaching material stored in the master tape 401 is transferred onto the copying track of the auxiliary endless tape 131.

When each unit of teaching material has been reproduced, the play-back key 17 may be unlocked by depressing the stop key to stop the motor if the learner wants to do an exercise with that unit of teaching material. The remote control switch 10 on the microphone 9 is then closed, whereby the relay Rel is operated to change over its contacts RL–1 and RL–2 into the imaginary positions. Thus, the output of the microphone 9 is amplified by the record amplifier 402 through line *l*2, and thereafter applied through SR5 – *l*5 – RL–1 to the record-reproduce head 142. At this time a bias current from the bias oscillator is applied to the head 142 through capacitor C2 and contact RL–1 while an erasing current is applied to the erase head 143 through SR7 – *l*6 – RL–2, and therefore the learner's oral exercise is recorded on the exercise track of the auxiliary tape 131. The recording level of the microphone 9 does not have to be adjusted during the recording process because it has already been adjusted by presetting an unshown semi-fixed resistor in the record amplifier 402. If the learner wants to hear his own recorded exercise after he has completed his oral practice, he may depress and lock the repeat key 15. Since the switches SP1 and SP3 are in the imaginary positions, the closed switch SW2 allows the motor 161 to drive the auxiliary tape 131 alone, whereby the output of the record-reproduce head 142, i.e. output signal on the copying track of the tape 131 is amplified through SP3 – SP1 – 403 – SR4 – 404 and vocalized through the loudspeaker 405. At the same time, the contacts RL–1 and RL–2 of the relay Rel are returned to their shown positions because the remote control switch has been opened after the completion of the oral exercise, and the output of the record-reproduce head 142 corresponding to the exercise track of the tape 131 carrying the learner's oral exercise is amplified through *l*3 – SP1 – 403 – SR4 – 404 and vocalized through the loudspeaker 405. Thus, the oral exercise on the auxiliary tape 131 is reproduced simultaneously with or after the teaching material on the master tape 401. If the learner wants to practice a further exercise, the learner may again close the remote control switch 10 of the microphone 9 and practice his oral exercise toward the microphone while listening to the reproduced copy of the teaching material. When this is completed, he may open the remote control switch 10 so that the teaching material and his own exercise are reproduced for comparison at the same time. In this way, the learner can repeat such process as frequently as he desires until he completely masters the given teaching material.

When it is desired to record new teaching material on the master tape 401, the record key 20 and the play-back key 17 are depressed at the same time and signals representing the new teaching material are applied as input through the microphone 9 or auxiliary input terminal "Aux". Such applied input is amplified through *l*4 – 402 – SR5 – SR3 while a bias current from the bias oscillator 407 is superposed thereon through the capacitor C3, and thereafter applied to the head 126, where the input signals representing the new teaching material are recorded on the tape 401 while the pre-recorded signals are erased by the erase head 127. In this case, the input level of the new signals is amplified by the amplifier 402 and then checked by the level meter 410 through the meter amplifier 409, whereby recording can be effected at a proper level by observing the level meter 410.

In the above-described embodiment, the operating voltage V1 is applied to the bias oscillator 407 having a very high power consumption rate only when recording is effected on the master tape 401 or when the auxiliary tape cassette 5 is placed in its operative position, and this helps to minimize the power consumption of the battery E.

Figure 15:
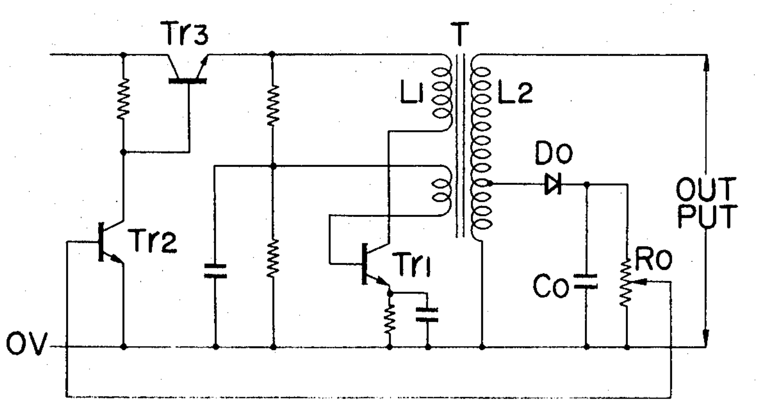
FIG. 15 is a diagram showing the bias oscillation circuit in the circuit of FIG. 14.

In the device of the present invention, a master tape and an auxiliary tape are normally used together, and for simplification of the operation, the recording level for the auxiliary tape may be pre-adjusted. Therefore, if the source voltage is varied to cause a quantitative variation in the bias supplied from the bias oscillator, there may occur a variation in the reproducing levels of the master and auxiliary tapes. To eliminate such variation, use may be made of a bias oscillation circuit as shown in FIG. 15, for example. In FIG. 15, transistor *Tr1* and oscillation transformer T constitute an oscillation circuit of the known type in which the oscillation output is derived from the secondary winding of the transformer T. A rectifier circuit Do takes out a part of the output of the secondary winding and converts it into a DC component with the aid of C*o* and R*O*. Transistors R*r*2 and R*r*3 control the current. With this circuit, the oscillation output provided by T*r*1 and T is converted into a DC component through D*o* and applied as base input to transistor T*r*2 so as to control the transistor T*r*3. Therefore, as the operating voltage is varied to decrease, the oscillation output voltage is also decreased, whereas such voltage decrement acts to reduce the collector current of transistor T*r*2 while increasing the collector current of transistor T*r*3. As a result, this serves to compensate for the source voltage variation, thereby maintaining the oscillation bias current constant at all times. Thus, the bias variation can be compensated for in the circuit, and proper recording level for the master and auxiliary tapes can be attacined by a simple arrangement.

As has been noted above, the present invention enables the learner to repeat his learning practice simply by operating various depression keys and a remote control switch, and this is very useful to enhance the learning efficiency.

Further, if the auxiliary endless tape is about twice as long as the master tape storing the teaching material, a half of the auxiliary tape length may be used to copy the teaching material and the other half may be available for the learner to record his own oral practice, whereby when the auxiliary tape is played back the learner can listen to the two types of record in succession and compare them with each other without waste of time.

Furthermore, if the learner is advanced in proficiency level, he may use a longer master tape edited for an advanced course of study corresponding to his improved proficiency level and an auxiliary tape having a length corresponding to that of the master tape, and thus the present invention can well meet the requirements of the learner at various proficiency levels.

Still furthermore, the recording and or reproducing of the teaching material and the learner's own exercise on the auxiliary tape can be so readily accomplished by simple changeover operations that the learner can go through his practice without worrying about the manipulation of the device, and this also leads to a very successful learning.

While the present invention has been shown and described with respect to an embodiment as applied for educational purposes, it will be apparent to those skilled in the art that it is possible to omit the means for providing record on the auxiliary tape and arrange the device so as to play back the auxiliary tape repeatedly. In such a case, a cartridge containing an auxiliary endless tape having a length substantially equal to each section of information stored in the master tape may be inserted in place so that the section of information may be transferred from the master tape onto the auxiliary endless tape, which may be played back as often as desired so as to reproduce that transferred information repeatedly in the same manner as described with respect to the illustrated embodiment.

In the above-described embodiment it is also possible to replace the auxiliary tape by a magnetic disc or drum or any other endless magnetic recording medium and it should be understood that other various changes and modifications may be made without departing from the scope and spirit of the invention as defined in the appended claims.

What is claimed is:

1. A magnetic recording and reproducing device capable of repeated reproduction, particularly for use in a teaching machine, comprising in combination:

means for mounting a first exchangeable cassette containing therein a magnetic master tape, on which a plurality of teaching material units are pre-recorded, the space bewteen the beginning of one unit and the beginning of the next succeeding unit being substantially constant;

first drive means for driving said master tape having a pinch roller and a first capstan driven by a drive source, said pinch roller and said first capstan holding said master tape therebetween and driving the same at a predetermined velocity;

means for mounting a second exchangeable cassette containing therein an endless magnetic recording and reproducing medium having a recording track of predetermined length;

first means for reproducing said teaching material units pre-recorded on said master tape onto said endless magnetic recording medium including a first magnetic head and a second magnetic head corresponding to the recording tracks of said master tape and said endless magnetic recording medium, respectively;

second drive means for driving said endless magnetic recording medium having a second capstan driven by said drive source at a predetermined velocity so that said endless magnetic recording medium completes one revolution in time corresponding to the time between the beginnings of succeeding teaching units on the master tape;

means for removably and exchangeably holding said second cassette in operative position and for urging said second magnetic head and said second capstan into contact with said magnetic recording medium in said second cassette:

second means for reproducing said teaching material unit recorded on said endless magnetic recording medium;

control means for selectively moving both said first and second drive means or the second drive means alone into operative position, said control means including a first actuating member for actuating said first drive means, a second actuating member for actuating said second drive means, a play key for simultaneously displacing both actuating members, and a repeat key for displacing said second actuating member alone, said first means for reproducing said teaching material units further including a high-frequency oscillator, an erase head opposed to said second cassette and disposed upstream of said second magnetic head with respect to the direction of movement of said magnetic recording medium in said second cassette, switching means closeable in response to displacement of said second actuating member to switch the reproducing means into operation, said erase head being connected with the output of said high-frequency oscillator through said switching means, and a power supply circuit for operating said high-frequency oscillator when said second cassette is in its operative position.

2. A magnetic recording and reproducing device according to claim 1 wherein said magnetic recording medium contained in said second cassette is an endless magnetic tape having a length substantially twice as long as each of said units of teaching material.

* * * * *

UNITED STATES PATENT OFFICE
CERTIFICATE OF CORRECTION

Patent No. 3,749,852 Dated July 31, 1973

Inventor(s) SHOZO MORIYA

It is certified that error appears in the above-identified patent and that said Letters Patent are hereby corrected as shown below:

In the Abstract, line 3, "device used" should read --device uses--;

Column 5, line 28, "while" should read --While--;

Column 6, line 4, "the laaner" should read --the learner--;

Column 6, line 17, "cae 1" should read --case 1--;

Column 6, line 51, "upwardly frfrom" should read --upwardly from--;

Column 7, line 27, "urged gy" should read --urged by--;

Column 8, line 3, "spirng 206" should read --spring 206--;

Column 8, line 42, "roller 118" should read --roller 108--;

Column 9, line 63, "trasmitted" should read --transmitted--;

Column 10, line 7, "slidably" should read --slidable--;

Column 10, line 21, "to the arrangement of" should read --of the arrangement of--;

Column 10, line 43, "bewteen" should read --between--;

Column 10, line 47, "to actuate the actuate the actuator" should read --to actuate the actuator--;

Column 11, line 64, "oeperable" should read --operable--;

Column 12, line 57, "durther" should read --further--;

Column 13, line 6, "comsumption" should read --consumption--;

UNITED STATES PATENT OFFICE

CERTIFICATE OF CORRECTION

Patent No. 3,749,852 Dated July 31, 1973

Inventor(s) SHOZO MORIYA

It is certified that error appears in the above-identified patent and that said Letters Patent are hereby corrected as shown below:

Column 15, line 2, "RO" should read --Ro--;

Column 15, line 3, "Rr2 and Rr3" should read --Tr2 and Tr3--;

Column 15, line 16, "attacined" should read --attained--;

Column 16, line 8, "bewteen" should read --between--;

Signed and sealed this 2nd day of April 1974.

(SEAL)
Attest:

EDWARD M.FLETCHER,JR.
Attesting Officer

C. MARSHALL DANN
Commissioner of Patents